UNITED STATES PATENT OFFICE.

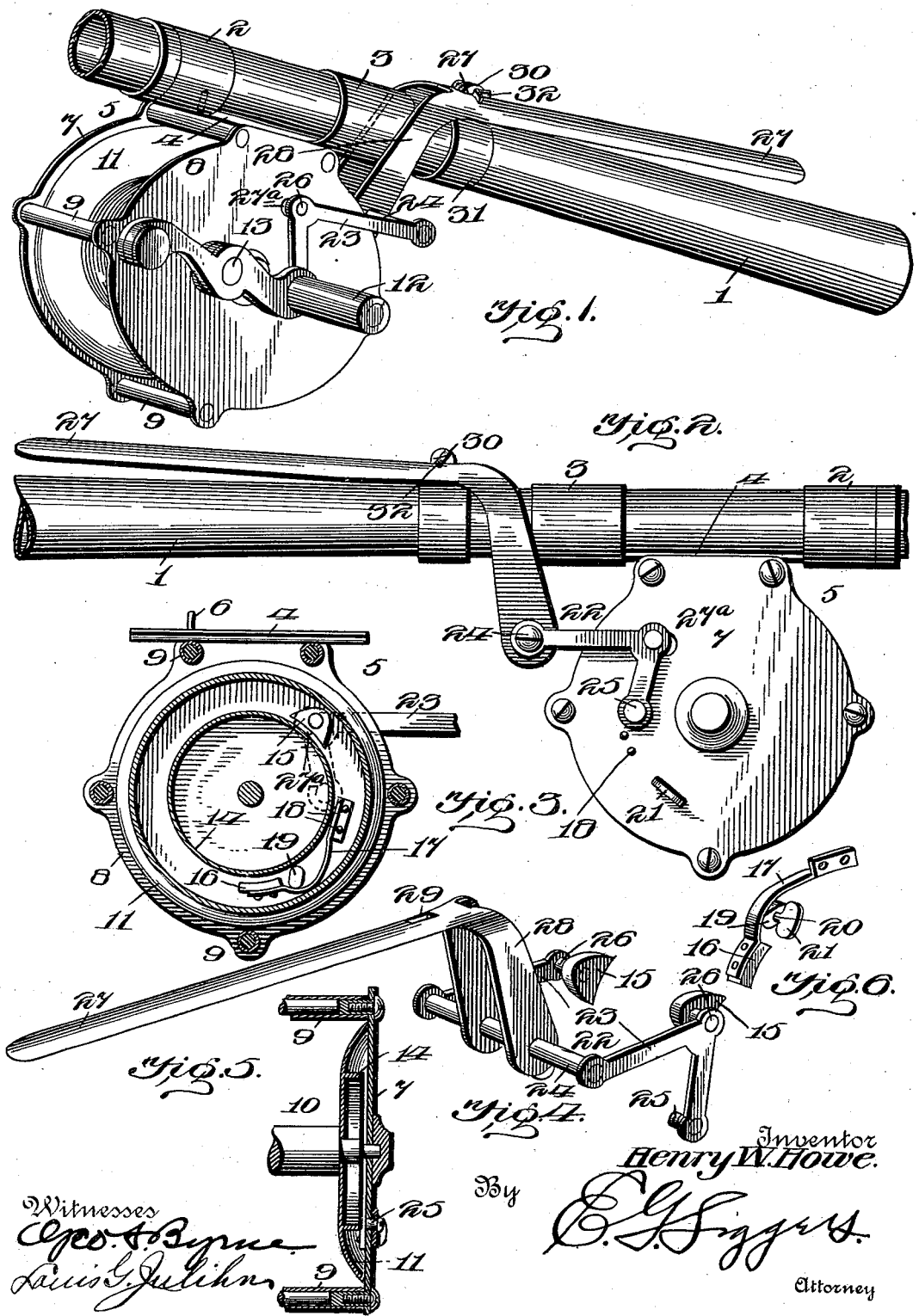

HENRY W. HOWE, OF MEXICO, MEXICO.

FISHING-REEL BRAKE.

SPECIFICATION forming part of Letters Patent No. 683,940, dated October 8, 1901.

Application filed November 27, 1900. Serial No. 37,915. (No model.)

*To all whom it may concern:*

Be it known that I, HENRY W. HOWE, a citizen of the United States, residing at the city of Mexico, in the Federal District and Republic of Mexico, have invented a new and useful Fishing-Reel Brake, of which the following is a specification.

This invention relates to improvements in fishing-reels, the object being to equip a reel of this character with a drag-brake which will normally operate with sufficient force to prevent "overrunning" or too free unwinding of the line and with a brake constantly under the control of the angler, so that the frictional resistance to the rotation of the reel may be instantly reduced or increased to any desired extent, thereby permitting the perfect control of the line to maintain it under any desired tension at all times while playing and landing the fish.

A further object of the invention is to provide novel means for attaching the reel-frame to the rod and for organizing the brake in a manner to cause it to distribute the pressure exerted thereby equally upon the opposite ends of the reel and to eliminate the use of links or other similar connections between the brake-lever and the brake-frame.

To the accomplishment of these objects and others subordinate thereto, all as will hereinafter more fully appear, the invention consists in the construction and arrangement of parts to be described, illustrated in the accompanying drawings, and defined in the appended claims.

In said drawings, Figure 1 is a perspective view of my device attached to a fishing-rod. Fig. 2 is a side elevation viewed from the side opposite that shown in Fig. 1. Fig. 3 is a sectional view illustrating the manner in which the drag and brake shoes are opposed to the brake-flanges located within the concavities of the reel-heads. Fig. 4 is a detail perspective view of the brake frame and shoes. Fig. 5 is a sectional view through one end of the reel-frame and one head of the reel, showing the reel-spindle in elevation; and Fig. 6 is a detail perspective view of the drag and its cam.

Referring to the numerals employed to designate corresponding parts throughout the views, 1 indicates a portion of a fishing rod or pole, and 2 and 3 the retaining bands or sleeves encircling the pole and serving to effect the attachment thereto of the attaching-plate 4 of the reel-frame 5. One end of the plate 4 is designed to be slipped under the band 3, and the other band, 2, which is slidable upon the rod, is then slipped over the opposite end of the plate, which latter, at a point intermediate of its ends, is provided with a stud 6, extending into the rod transversely to prevent accidental endwise movement of the plate and the consequent release of the reel in the event of the slipping of the band 2.

The reel-frame 5 is composed, as usual, of a pair of substantially circular head-plates 7 and 8, connected in spaced relation by a series of posts 9. Between the end plates 7 and 8 and at the axes thereof is journaled the spindle 10 of the reel, whose heads 11 are of circular dished form and are disposed against the opposed faces of the frame-plate, with their concavities closed thereby. The reel thus mounted is designed to be rotated by a crank 12, mounted upon a short shaft 13, passed through the plate 8 at an eccentric point and geared to the spindle in a manner well understood in the art, and therefore unnecessary to illustrate.

We now come to the consideration of the drag and brake, the former being designed to exert a moderate resistance to the rotation of the reel for the purpose of preventing overrunning of the line and the latter to be constantly controlled by the angler for the purpose of instantly applying more or less resistance as it is desired to play the fish or rewind the line preparatory to landing the finny prize.

Within the concavity of each reel-head 11 is formed, preferably integral with the head, an annular brake-flange 14. Against these flanges the brake-shoes 15 are designed to bear, and the drag-shoe 16 is arranged to contact with one or both of them, as desired. The drag-shoe 16 is supported at the free end of the drag-spring 17, located within the concavity of one of the reel-heads and fixedly connected at its end opposite the shoe to the plate 7 of the reel-frame—as, for instance, by rivets 18. At a point intermediate of its ends the spring 17 is provided with a pronounced curvature in order to permit the interposition of what may be termed the "drag-cam" 19 between the spring and the brake-flange and mounted upon one end of a stud-shaft 20, passed through the plate 7, and provided upon the exterior thereof with a thumb-piece or handle 21, by means of which the cam may be turned to retain the drag-shoe out of contact with the brake-flange or to permit its contact therewith for the purpose of exerting sufficient drag upon the reel to prevent overrunning of the line. The brake-shoes 15 are mounted upon and designed to be simultaneously actuated by a brake-frame 22, comprising a pair of angular or substantially bell-crank-shaped levers 23, disposed against the outer faces of the plates and connected by a cross-bar 24, located behind the reel-frame. The levers or arms 23 are pivoted at their ends opposite the bar 24 upon pintles 25, screwed or otherwise secured to the plates 7 and 8 and extending outwardly therefrom. The brake-shoes 15, which are connected with the levers or arms 23 at the angles thereof, are, as heretofore stated, located within the concavities of the reel-heads for contact with the oppositely-extending brake-flanges 14, and as the arms 23 are located beyond the outer faces of the plates said arms are provided with inwardly-extending studs 26, passed through slots 27ª in the frame-plates and carrying the brake-shoes at their inner ends. It will now be observed that lateral movement of the cross-bar 24 of the brake-frame will cause the brake-shoes 15 to approach or recede from the brake-flanges, as the case may be. In order to effect this movement, therefore, I provide a brake-lever 27, disposed at that side of the rod 1 opposite the reel and provided with a bifurcated end 28, the bifurcations of which straddle the rod and are connected to the cross-bar 24 of the brake-frame 22. If the lever 27 were provided with a fixed axis, it is evident that a link or other connection of like character would have to be interposed between the bifurcated end 28 of the lever and the bar 24. I have therefore devised what appears to be a novel mounting for the lever 27, which consists in providing an elongated slot 29 in said lever adjacent to its bifurcated end, or rather adjacent to the angle of the lever, for the reception of a fulcrum-stud 30, formed by the opposed outstanding ears of a split ring 31, encircling the rod and provided with a cotter or other key 32, passed through the ears and serving as a retainer for the brake-lever. By reason of this connection it will be observed that the brake-lever may be connected directly to the pivoted brake-frame and that the elevation and depression of the former will effect the application of the brake-shoes to the brake-flanges or their withdrawal therefrom, as may be desired.

For convenience of illustration I have shown the reel as being disposed below the rod; but it is evident that the relative positions of these parts are absolutely immaterial, since the individual angler or user will dispose the reel above or below the rod, as suits his individual taste and convenience.

In use it will be noted that the drag-cam may be turned to permit the drag-spring to urge the drag-shoe against the flange of the reel to exert more or less drag thereon and that by the manipulation of the brake-lever any desired degree of frictional resistance may be opposed to the rotation of the reel by forcing the brake-shoes 15 against the brake-flanges 14, formed integral with the reel-heads at the opposite ends thereof; but while the present embodiment of my invention appears at this time to be preferable I desire to reserve the right to effect such changes, modifications, and variations as may be suggested by experience and experiment, so long as they are embodied within the scope of the protection prayed.

What I claim is—

1. A fishing-reel comprising a frame, a reel mounted therein and provided with brake-flanges, connected brake-shoes opposed to the flanges, and a brake-lever for simultaneously urging the brake-shoes against said flanges.

2. A fishing-reel comprising a frame, a reel mounted in the frame, a pair of brake-shoes located within the frame and bearing against the reel, a brake-frame pivoted upon the exterior of the reel-frame located wholly exterior to said frame and operatively connected with the brake-shoes, and means for shifting the brake-frame to operate the shoes.

3. A fishing-reel comprising a frame, a reel mounted therein, brake-shoes located in the frame and bearing against the reel at its opposite ends, a brake-frame comprising connected arms located beyond the opposite ends of the reel-frame, and connecting members extending into the reel-frame from the arms of the brake-frame to operate the shoes.

4. A fishing-reel comprising a frame, a reel mounted therein and provided with terminal heads having oppositely-extending brake-flanges, brake-shoes opposed to said flanges, a brake-frame comprising a pair of side arms pivoted beyond the ends of the reel-frame and connected by a cross-bar, studs projecting from the side arms and extending through the ends of the reel-frame and connected to the brake-shoes to operate the latter when the brake-frame is swung upon its pivot, and a brake-lever connected to the cross-bar of the brake-frame.

5. In a fishing-reel, the combination with a frame and reel, of a pivoted brake-frame having connected brake-shoes arranged for engagement with the reel, and a slotted brake-lever loosely engaging a fulcrum-stud and connected directly to the brake-frame.

6. The combination with a fishing-rod provided with a fulcrum-stud, of a reel-frame connected to the rod, a reel mounted therein, a pair of brake-shoes opposed to the reel, a pivoted brake-frame connecting and designed to operate said shoes, and a slotted brake-lever loosely engaging the fulcrum-stud and having a bifurcated end straddling the rod and pivotally connected to the brake-frame.

7. The combination with a fishing-rod provided with a fulcrum-stud, of a reel-frame connected to the rod, a reel mounted in the reel-frame and provided with terminal heads having oppositely-extending brake-flanges, brake-shoes opposed to said flanges, a brake-frame comprising angular side arms terminally pivoted beyond the outer ends of the reel-frame, studs extending from the angles of said side arms through the ends of the reel-frame and connected to the brake-shoes, a cross-bar connecting the free ends of the side arms, and a slotted brake-lever loosely engaging the fulcrum-stud upon the rod and having a bifurcated end straddling the rod and pivotally connected to the cross-bar of the brake-frame.

8. In a fishing-reel, the combination with a frame and reel provided with a brake-flange, of a drag-shoe opposed to said flange, a spring supporting said shoe and fixed to the reel-frame, a drag-cam opposed to said spring to urge it away from the flange, and a rotary thumb-piece disposed exterior to the reel-frame and connected to the drag-cam to operate the latter, said drag-cam being extended like distances on either side of its axis to permit the relief of the drag by the partial rotation of the thumb-piece in either direction.

9. The combination with a fishing-rod, of a reel-frame provided with an attaching-plate having a fixed retaining-stud engaging the rod, and a pair of sleeves encircling the rod and engaging the opposite ends of the plate.

In testimony that I claim the foregoing as my own I have hereto affixed my signature in the presence of two witnesses.

HENRY W. HOWE.

Witnesses:
   MEGUEL CASTRAYN,
   JERRY HARVEY.